United States Patent
Islam

(10) Patent No.: US 11,637,466 B1
(45) Date of Patent: Apr. 25, 2023

(54) MECHANICAL AND ELECTROMECHANICAL ARRANGEMENTS FOR FIELD-WEAKENING OF AN ELECTRIC MACHINE THAT UTILIZES PERMANENT MAGNETS

(71) Applicant: Tula eTechnology Inc., San Jose, CA (US)

(72) Inventor: Md. Zakirul Islam, San Jose, CA (US)

(73) Assignee: Tula eTechnology Inc., San Jose, CA (US)

( * ) Notice: Subject to any disclaimer, the term of this patent is extended or adjusted under 35 U.S.C. 154(b) by 0 days.

(21) Appl. No.: 17/703,561

(22) Filed: Mar. 24, 2022

Related U.S. Application Data

(60) Provisional application No. 63/262,672, filed on Oct. 18, 2021.

(51) Int. Cl.
| | | |
|---|---|---|
| *H02K 1/27* | (2022.01) | |
| *H02K 21/02* | (2006.01) | |
| *H02K 1/2781* | (2022.01) | |
| *H02K 1/02* | (2006.01) | |

(52) U.S. Cl.
CPC ............. *H02K 1/2781* (2022.01); *H02K 1/02* (2013.01); *H02K 21/028* (2013.01)

(58) Field of Classification Search
CPC ...... H02K 1/2781; H02K 1/02; H02K 21/028; H02K 1/276; H02K 1/2766
See application file for complete search history.

(56) References Cited

U.S. PATENT DOCUMENTS

| | | | |
|---|---|---|---|
| 4,441,043 | A | 4/1984 | Decesare |
| 4,989,146 | A | 1/1991 | Imajo |
| 5,099,410 | A | 3/1992 | Divan |
| 5,151,637 | A | 9/1992 | Takada et al. |
| 5,325,028 | A | 6/1994 | Davis |
| 5,483,141 | A | 1/1996 | Uesugi |
| 5,640,073 | A | 6/1997 | Ikeda |
| 5,731,669 | A | 3/1998 | Shimizu |

(Continued)

FOREIGN PATENT DOCUMENTS

| | | |
|---|---|---|
| CN | 1829070 | 9/2006 |
| CN | 102381265 | 3/2012 |

(Continued)

OTHER PUBLICATIONS

Cai et al., "Torque Ripple Reduction for Switched Reluctance Motor with Optimized PWM Control Strategy", Energies, vol. 11, Oct. 15, 2018, pp. 1-27.

(Continued)

*Primary Examiner* — Thomas Truong
(74) *Attorney, Agent, or Firm* — Brooks, Cameron & Huebsch, PLLC

(57) ABSTRACT

Methods, systems, and mechanical and electromechanical arrangements for field-weakening of an electric machine that utilizes permanent magnets are disclosed herein. One rotor assembly for an electric motor includes a rotor body that moves with respect to a central axis, the rotor body having a core and a number of permanent magnets that move with the rotor body, and the rotor body also having a number of movable field-weakening magnetic materials that move with respect to the permanent magnets and to the central axis.

20 Claims, 13 Drawing Sheets

(56) References Cited

U.S. PATENT DOCUMENTS

| | | |
|---|---|---|
| 6,291,960 B1 | 9/2001 | Crombez |
| 6,308,123 B1 | 10/2001 | Ikegaya et al. |
| 6,370,049 B1 | 4/2002 | Heikkil Ang |
| 6,424,799 B1 | 7/2002 | Gilmore |
| 6,493,204 B1 | 12/2002 | Glidden et al. |
| 6,605,912 B1 | 8/2003 | Bharadwaj et al. |
| 6,829,515 B2 | 12/2004 | Grimm |
| 6,829,556 B2 | 12/2004 | Kumar |
| 6,906,485 B2 | 6/2005 | Hussein |
| 6,940,239 B2 | 9/2005 | Iwanaga et al. |
| 7,190,143 B2 | 3/2007 | Wei et al. |
| 7,259,664 B1 | 8/2007 | Cho et al. |
| 7,327,545 B2 | 2/2008 | Konishi |
| 7,411,801 B2 | 8/2008 | Welchko et al. |
| 7,453,174 B1 | 11/2008 | Kalsi |
| 7,558,655 B2 | 7/2009 | Garg et al. |
| 7,577,511 B1 | 8/2009 | Tripathi et al. |
| 7,616,466 B2 | 11/2009 | Chakrabarti et al. |
| 7,768,170 B2 | 8/2010 | Tatematsu et al. |
| 7,852,029 B2 | 12/2010 | Kato et al. |
| 7,960,888 B2 | 6/2011 | Ai et al. |
| 7,969,341 B2 | 6/2011 | Robbe et al. |
| 8,020,651 B2 | 9/2011 | Zillmer et al. |
| 8,099,224 B2 | 1/2012 | Tripathi et al. |
| 8,768,563 B2 | 7/2014 | Nitzberg et al. |
| 8,773,063 B2 | 7/2014 | Nakata |
| 9,046,559 B2 | 6/2015 | Lindsay et al. |
| 9,050,894 B2 | 6/2015 | Banerjee et al. |
| 9,308,822 B2 | 4/2016 | Matsuda |
| 9,495,814 B2 | 11/2016 | Ramesh |
| 9,630,614 B1 | 4/2017 | Hill et al. |
| 9,702,420 B2 | 7/2017 | Yoon |
| 9,758,044 B2 | 9/2017 | Gale et al. |
| 9,948,173 B1 | 4/2018 | Abu Qahouq |
| 10,060,368 B2 | 8/2018 | Pirjaberi et al. |
| 10,081,255 B2 | 9/2018 | Yamada et al. |
| 10,256,680 B2 | 4/2019 | Hunstable |
| 10,273,894 B2 | 4/2019 | Hunstable |
| 10,291,168 B2 | 5/2019 | Fukuta |
| 10,320,249 B2 | 6/2019 | Okamoto et al. |
| 10,381,968 B2 | 8/2019 | Agirman |
| 10,476,421 B1 | 11/2019 | Khalil et al. |
| 10,550,776 B1 | 2/2020 | Leone et al. |
| 10,742,155 B2 | 8/2020 | Tripathi |
| 10,944,352 B2 | 3/2021 | Mazda et al. |
| 11,088,644 B1 | 8/2021 | Carvell |
| 11,133,767 B2 | 9/2021 | Serrano et al. |
| 2001/0039926 A1 | 11/2001 | Kobayashi et al. |
| 2002/0043954 A1 | 4/2002 | Hallidy |
| 2003/0173931 A1 | 9/2003 | Edelson |
| 2004/0212359 A1 | 10/2004 | Slater et al. |
| 2005/0127861 A1 | 6/2005 | Mcmillan et al. |
| 2005/0151437 A1 | 7/2005 | Ramu |
| 2005/0160771 A1 | 7/2005 | Hosoito et al. |
| 2007/0216345 A1 | 9/2007 | Kanamori |
| 2007/0287594 A1 | 12/2007 | Degeorge et al. |
| 2008/0129243 A1 | 6/2008 | Nashiki |
| 2008/0179980 A1 | 7/2008 | Dawsey et al. |
| 2009/0045691 A1 | 2/2009 | Ichiyama |
| 2009/0121669 A1 | 5/2009 | Hanada |
| 2009/0128072 A1 | 5/2009 | Strong et al. |
| 2009/0146615 A1 | 6/2009 | Zillmer et al. |
| 2009/0179608 A1 | 7/2009 | Welchko et al. |
| 2009/0306841 A1 | 12/2009 | Welchko et al. |
| 2010/0010724 A1 | 1/2010 | Tripathi et al. |
| 2010/0201294 A1 | 8/2010 | Yuuki et al. |
| 2010/0296671 A1 | 11/2010 | Khoury et al. |
| 2011/0029179 A1 | 2/2011 | Miyazaki et al. |
| 2011/0089774 A1 | 4/2011 | Kramer |
| 2011/0101812 A1* | 5/2011 | Finkle ............... H02K 21/028 310/156.24 |
| 2011/0130916 A1 | 6/2011 | Mayer |
| 2011/0208405 A1 | 8/2011 | Tripathi et al. |
| 2012/0056569 A1 | 3/2012 | Takamatsu et al. |
| 2012/0112674 A1 | 5/2012 | Schulz et al. |
| 2012/0169263 A1 | 7/2012 | Gallegos-Lopez et al. |
| 2012/0217921 A1 | 8/2012 | Wu et al. |
| 2013/0134912 A1 | 5/2013 | Khalil et al. |
| 2013/0141027 A1 | 6/2013 | Nakata |
| 2013/0226420 A1 | 8/2013 | Pedlar et al. |
| 2013/0241445 A1 | 9/2013 | Tang |
| 2013/0258734 A1 | 10/2013 | Nakano et al. |
| 2014/0018988 A1 | 1/2014 | Kitano et al. |
| 2014/0028225 A1 | 1/2014 | Takamatsu et al. |
| 2014/0130506 A1 | 5/2014 | Gale et al. |
| 2014/0176034 A1 | 6/2014 | Matsumura et al. |
| 2014/0217940 A1 | 8/2014 | Kawamura |
| 2014/0265957 A1 | 9/2014 | Hu et al. |
| 2014/0292382 A1 | 10/2014 | Ogawa et al. |
| 2014/0354199 A1 | 12/2014 | Zeng et al. |
| 2015/0025725 A1 | 1/2015 | Uchida |
| 2015/0240404 A1 | 8/2015 | Kim et al. |
| 2015/0246685 A1 | 9/2015 | Dixon et al. |
| 2015/0261422 A1 | 9/2015 | Den et al. |
| 2015/0297824 A1 | 10/2015 | Cabiri et al. |
| 2015/0318803 A1 | 11/2015 | Wu et al. |
| 2016/0114830 A1 | 4/2016 | Dixon et al. |
| 2016/0226409 A1 | 8/2016 | Ogawa |
| 2016/0233812 A1 | 8/2016 | Lee et al. |
| 2016/0269225 A1 | 9/2016 | Kirchmeier et al. |
| 2016/0373047 A1 | 12/2016 | Loken et al. |
| 2017/0087990 A1 | 3/2017 | Neti et al. |
| 2017/0163108 A1* | 6/2017 | Schencke ............... H02K 1/28 |
| 2017/0331402 A1 | 11/2017 | Smith et al. |
| 2018/0032047 A1 | 2/2018 | Nishizono et al. |
| 2018/0045771 A1 | 2/2018 | Kim et al. |
| 2018/0154786 A1 | 6/2018 | Wang et al. |
| 2018/0276913 A1 | 9/2018 | Garcia et al. |
| 2018/0323665 A1 | 11/2018 | Chen et al. |
| 2018/0334038 A1 | 11/2018 | Zhao et al. |
| 2019/0058374 A1 | 2/2019 | Enomoto et al. |
| 2019/0288629 A1 | 9/2019 | Tripathi |
| 2019/0288631 A1 | 9/2019 | Tripathi |
| 2019/0341820 A1* | 11/2019 | Krizan ............... H02K 21/028 |
| 2020/0212834 A1 | 7/2020 | Mazda et al. |
| 2020/0262398 A1 | 8/2020 | Sato et al. |
| 2020/0328714 A1 | 10/2020 | Tripathi |
| 2020/0343849 A1 | 10/2020 | Coroban-Schramel |
| 2020/0366223 A1 | 11/2020 | Coroban-Schramel |
| 2021/0203263 A1 | 7/2021 | Serrano et al. |
| 2021/0351733 A1 | 11/2021 | Carvell |

FOREIGN PATENT DOCUMENTS

| | | |
|---|---|---|
| CN | 104716754 | 6/2015 |
| CN | 204589885 | 8/2015 |
| CN | 105196877 | 12/2015 |
| CN | 205229379 | 5/2016 |
| CN | 106932208 | 7/2017 |
| CN | 107067780 | 8/2017 |
| CN | 207129052 | 3/2018 |
| CN | 108216026 | 6/2018 |
| CN | 108445386 | 8/2018 |
| CN | 110212725 A * | 9/2019 |
| DE | 102014206342 | 10/2015 |
| EP | 2605398 | 6/2013 |
| ES | 2816386 | 4/2021 |
| FR | 2989479 | 10/2013 |
| JP | 10-243680 | 9/1998 |
| JP | 2008-079686 | 4/2008 |
| JP | 2009-065758 | 3/2009 |
| JP | 2011067043 | 3/2011 |
| JP | 2014-033449 | 2/2014 |
| JP | 2017-011970 | 1/2017 |
| JP | 2017-200382 | 11/2017 |
| JP | 2018-033250 | 3/2018 |
| KR | 10-2010-0021146 | 2/2010 |
| KR | 10-2017-0021146 | 2/2017 |
| KR | 10-2017-0032976 | 3/2017 |

(56) References Cited

FOREIGN PATENT DOCUMENTS

| WO | 03/36787 | 5/2003 |
|---|---|---|
| WO | 2012-010993 | 1/2012 |

OTHER PUBLICATIONS

Carvell et al., U.S. Appl. No. 17/204,269, filed Mar. 17, 2021.
Carvell, U.S. Appl. No. 16/866,917, filed May 5, 2020.
Carvell, U.S. Appl. No. 17/188,189, filed Mar. 1, 2021.
Islam, U.S. Appl. No. 17/220,228, filed Apr. 1, 2021.
Luckjiff et al., "Hexagonal$Sigma Delta$Modulators in Power Electronics", IEEE Transactions on Power Electronics, vol. 20, No. 5, Sep. 2005, pp. 1075-1083.
Mirzaeva et al., "The use of Feedback Quantizer PWM for Shaping Inverter Noise Spectrum", Power Electronics and Motion Control Conference (EPE/PEMC), 2012 15th International IEEE, Sep. 4, 2012, pp. DS3c. 10-1, XP032311951, DOI: 10.1109/EPEPEMC.2012.6397346, ISBN: 978-1-4673-1970.6.
Ramsey, "How this father and son's new electric turbine could revolutionize electric cars; The Hunstable Electric Turbine can produce up to three times the torque of any other motor", Available Online at <https://www.autoblog.com/2020/03/08/hunstable-electric-turbine/>, Mar. 8, 2020, 9 pages.
Serrano et al, U.S. Appl. No. 16/689,450, filed Nov. 20, 2019.
Spong et al., "Feedback Linearizing Control of Switched Reluctance Motors", IEEE Transactions on Automatic Control, vol. AC-32, No. 5, May 1987, pp. 371-379.
Srinivasan, U.S. Appl. No. 17/158,230, filed Jan. 26, 2021.
Srinivasan, U.S. Appl. No. 17/188,509, filed Mar. 1, 2021.
Tripathi, U.S. Appl. No. 16/353,159, filed Mar. 14, 2019.
Tripathi, U.S. Appl. No. 16/912,313, filed Jun. 25, 2020.
Tripathi, U.S. Appl. No. 16/353,166, filed Mar. 14, 2019.
International Search Report and Written Opinion from related PCT Application No. PCT/US2022/021768, dated Jul. 7, 2022, 9 pages.
International Search Report and Written Opinion from related PCT Application PCT/US2022/040153, dated Jan. 17, 2023, 13 pages.

* cited by examiner

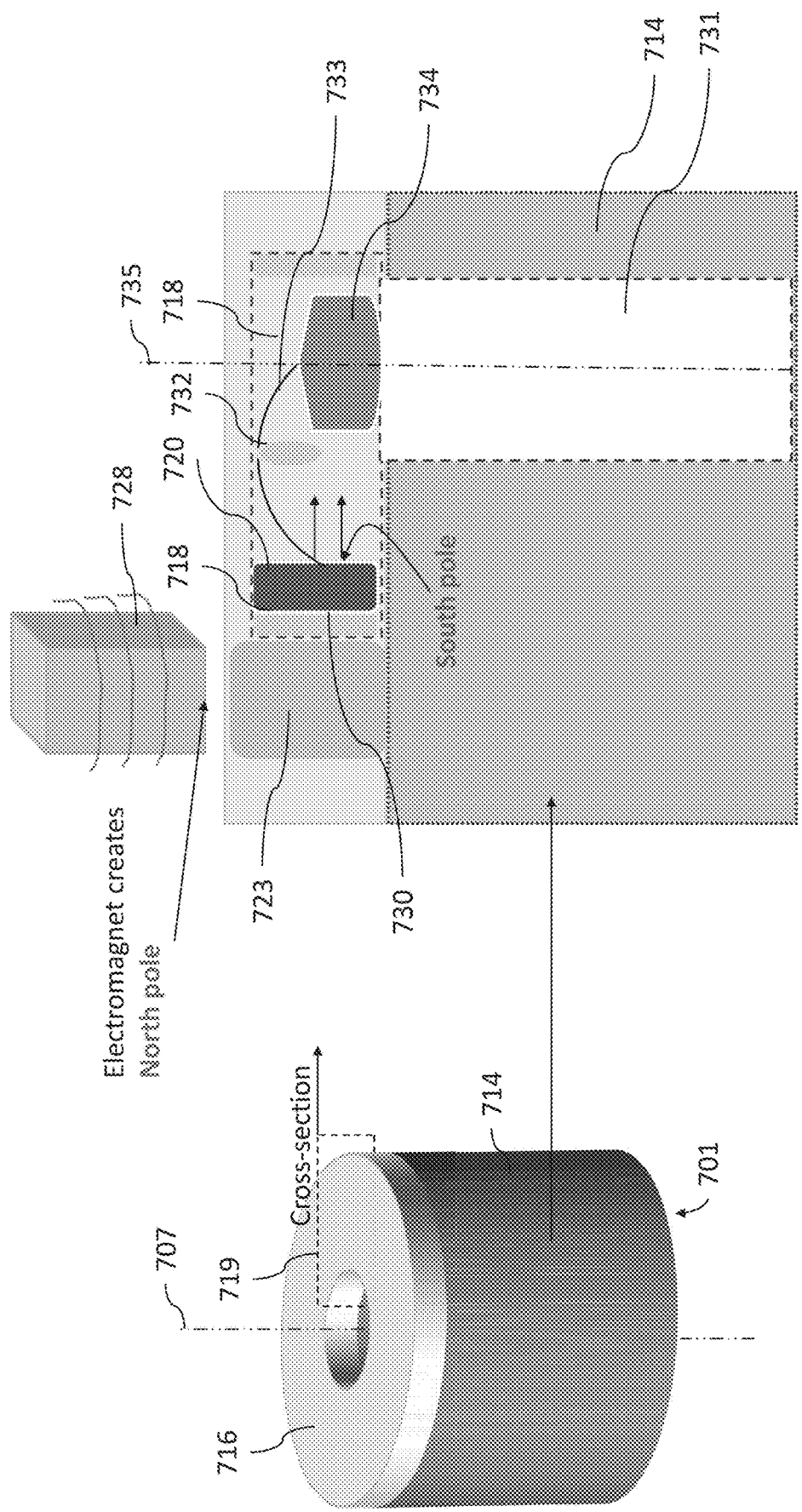

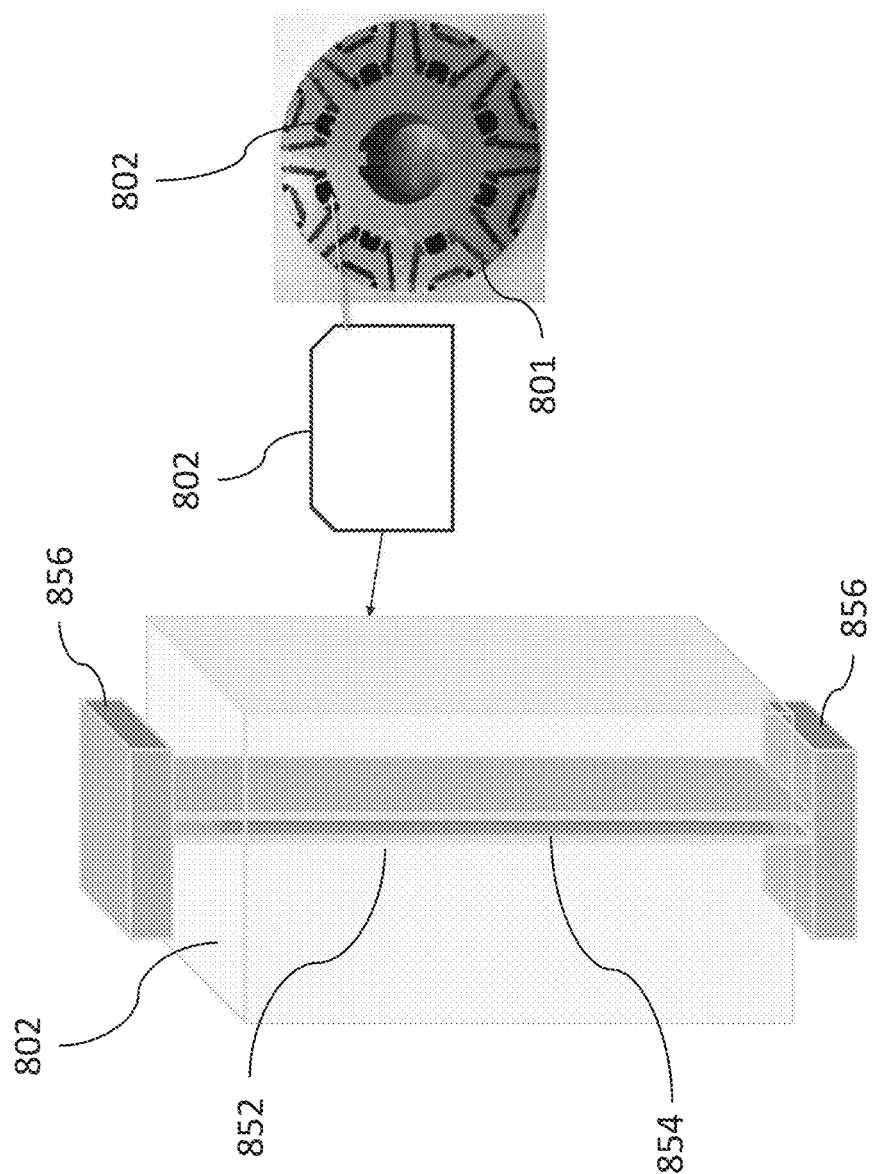

MECHANICAL AND ELECTROMECHANICAL ARRANGEMENTS FOR FIELD-WEAKENING OF AN ELECTRIC MACHINE THAT UTILIZES PERMANENT MAGNETS

PRIORITY INFORMATION

This application claims the benefit of U.S. Provisional Application No. 63/262,672, filed Oct. 18, 2021, the contents of which are incorporated herein by reference.

TECHNICAL FIELD

The present disclosure relates to methods, devices, and systems for field-weakening of permanent magnets in electric motors and, in particular, to mechanical and electromechanical arrangements for field-weakening of an electric machine that utilizes permanent magnets

BACKGROUND

The phrase "electric machine" as used herein is intended to be broadly construed to include machines that operate as either or both electric motors and generators. When an electric machine is operating as a motor, it converts electrical energy into mechanical energy. When operating as a generator, the electric machine converts mechanical energy into electrical energy.

Field-weakening is very important, for example, in permanent magnet synchronous motors (PMSM) in the field of electric vehicle power generation in order for an electric motor to achieve higher speeds. However, presently field-weakening involves additional current excitation to oppose the magnetic field of the magnets on the rotor.

Specifically, to operate permanent magnet synchronous motors at higher speed, a field-weakening current has to be applied to weaken the magnetic field created by the permanent magnets in the rotor. This current is typically referred as d-axis current that opposes the magnetic fields of the permanent magnets.

For electric vehicle applications, permanent magnet motors show very attractive efficiency in the low to medium speed and torque range. However, efficiency drops in the higher speed region due to the need to generate additional field-weakening current. This is because, to continuously run the motor at higher speeds, this field-weakening current must be continuously supplied. This field-weakening approach is a lossy process as it creates copper losses from the field-weakening currents and, therefore, is disadvantageous to motor operation.

One alternative approach is to utilize electrotechnical field-weakening. However, there are very few techniques for electrotechnical field-weakening of electric motors, and those processes are complex, costly, and hard to adopt and operate. Accordingly, the lossy process has been the best option for implementing field-weakening.

BRIEF DESCRIPTION OF THE DRAWINGS

FIG. 7B illustrates the arrangement for field-weakening illustrated in FIG. 7A where the electromagnet generates a repulsion force.

FIG. 8 is another electromechanical arrangement for field-weakening in accordance with embodiments of the present disclosure.

DETAILED DESCRIPTION

Figure 1:
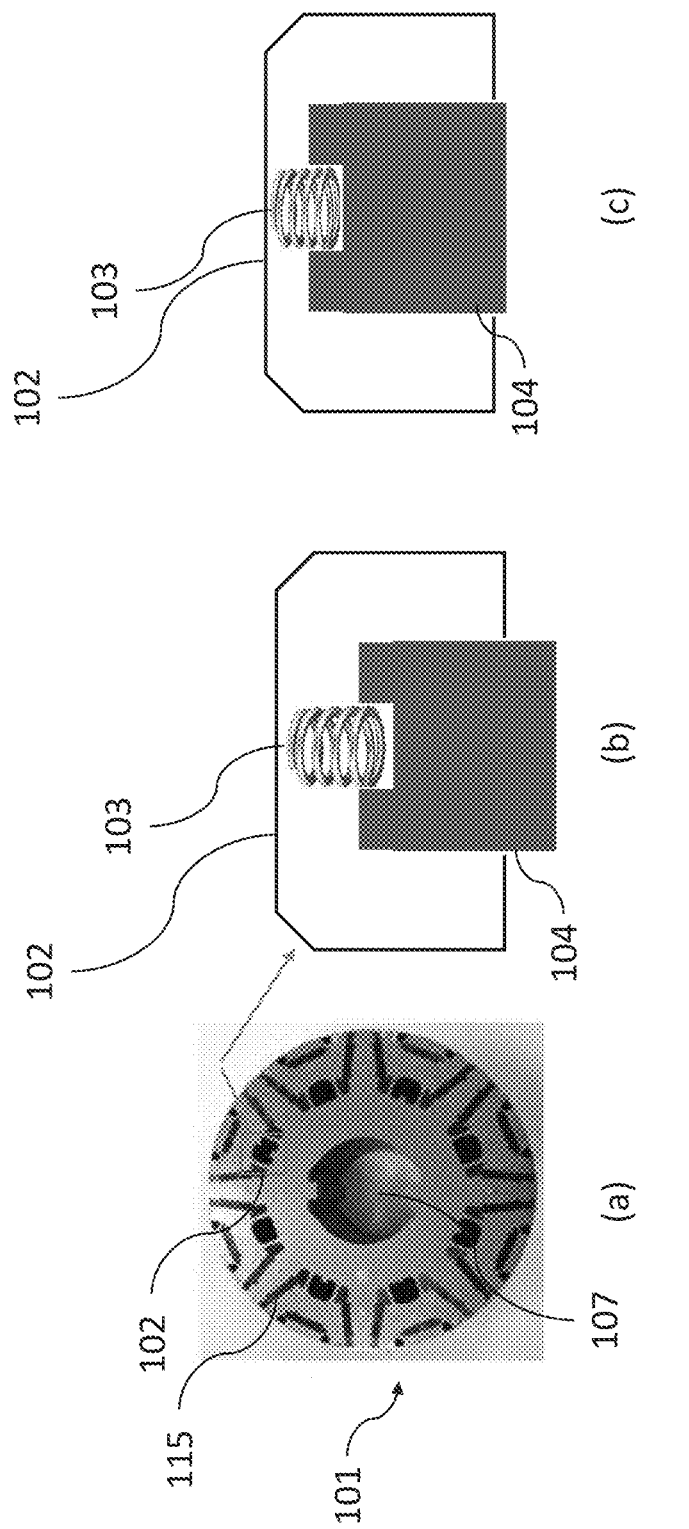
FIG. 1 is an arrangement for field-weakening in accordance with embodiments of the present disclosure.

The present disclosure provides methods, systems, and mechanical and electromechanical arrangements for field-weakening of an electric machine that utilizes at least one permanent magnet as part of its rotor-stator design. The embodiments of the present disclosure allow for a magnetic material to be moved closer to or into a magnetic field created due to the interaction between the rotor and stator to weaken the field. This action is referred to as engaging the field-weakening magnetic material. The embodiments of the present disclosure can be utilized in electric machines including motors where the stator is outside or inside of the rotor or side by side along central axis for axial flux motor, for example.

The embodiments of the present disclosure also include the ability to disengage the field-weakening magnetic material. This is accomplished, for example, by moving the material farther away from or out of the magnetic field created due to the interaction between the rotor and stator to weaken the field. These actions of engaging and disengaging can be accomplished mechanically or electromechanically as will be described in more detail below.

Further, the movement that creates the engagement and disengagement can be either radially or laterally in various embodiments. For example, in one embodiment, a rotor assembly incudes a rotor body that moves with respect to a central axis, the rotor body having a core and a number of permanent magnets that move with the rotor body, and the rotor body also having a number of movable field-weakening magnetic materials that move with respect to the permanent magnets and to the central axis One rotor assembly embodiment for an electric machine that describes the general components that can be used in either mechanical or electromechanical implementations, but with radial movement includes a rotor body that rotates around a central axis, the rotor body having a number of permanent magnets that rotate with the rotor at a fixed distance from a central axis, and the rotor body also having a number of movable field-weakening components containing magnetic materials that move with respect to their distance to the central axis. Other embodiments will be discussed in more detail below.

The electromagnetic arrangement concepts disclosed herein can reduce the loss created by field-weakening current as partial field-weakening will happen through the arrangements of the present disclosure. Further, speeds of permanent magnet electric machines are often limited due to several factors such as: battery voltage, number and type of windings, and number and strength of the permanent magnets. The concept disclosed herein is to weaken the magnetic field in a different manner than done previously, that is, with a magnetic material arrangement rather than applying a continuous field-weakening current (Id, d-axis equivalent circuit current). In this manner, current loss can be reduced, and motor speed can be increased.

For example, in one embodiment, a movable field-weakening magnetic material can be moved inside a rotor or proximate the end of the rotor that can shorten the permanent magnet's magnetic flux path to reduce permanent magnet flux linkage to the stator. Thus, the strength of the permanent magnet will be weakened by the movable field-weakening magnetic material. The field-weakening works to weaken the rotor magnet's magnetic field in a permanent magnet synchronous motor at higher speed conditions by engaging magnetic material to leak out partial flux of the rotor permanent magnets.

In another embodiment, an electric machine includes a stator having a plurality of electromagnets generating a magnetic field, wherein the electromagnets are arranged around a central axis and a rotor assembly having a rotor body that rotates around a central axis, the rotor body having a number of permanent magnets that rotate with the rotor at a fixed distance from a central axis, and the rotor body also having a number of movable field-weakening magnetic materials that move with respect to the central axis.

In such an embodiment, the rotor body can include a movable field-weakening magnetic material chamber that allows one of the number of movable field-weakening magnetic materials positioned therein to change its lateral position along a chamber axis that is parallel with respect to the central axis. Embodiments can also provide a rotor body that includes a first movable field-weakening magnetic material chamber allowing a first of the number of movable field-weakening magnetic materials positioned therein to change its position with respect to its distance to the central axis and a second movable field-weakening magnetic material chamber that allows a second of the number of movable field-weakening magnetic materials.

In the following detailed description, reference is made to the accompanying drawings that form a part hereof. The drawings show, by way of illustration, how one or more embodiments of the present disclosure may be practiced.

These embodiments are described in sufficient detail to enable those of ordinary skill in the art to practice one or more embodiments of the present disclosure. It is to be understood that other embodiments may be utilized and that process, computerized, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing.

As used herein, "a" or "a number of" something can refer to one or more such things. For example, "a number of valves" can refer to one or more valves. As used herein, "a plurality of" means two or more things.

FIG. 1 is an arrangement for field-weakening in accordance with embodiments of the present disclosure. FIG. 1 provides an example, at image (a), using an internal permanent magnet rotor 101. The rotor includes a number of apertures 102 formed therein. In this embodiment, an aperture 102 can have a movable field-weakening magnetic material 104 positioned within the aperture.

The arrangement also includes a resilient mechanism 103 that will allow the magnetic material 104 to move within the aperture but return the magnet to its original position by utilizing the mechanism's resilient properties. Suitable resilient mechanisms can include mechanical devices, such as springs, magnetic mechanisms such as non-powered magnets and electromagnets, and resilient materials, such as materials with elastic properties.

Further, in various embodiments, the one or more apertures can be any depth into the rotor as desired. For example, an aperture can have a small depth to accommodate a magnet with a small depth or the aperture can have a large depth where the aperture is similar to a tunnel. A large depth aperture can, for example, be as deep as from a top surface of the rotor to a bottom surface of the rotor and wherein the movable magnet is an elongate cylinder shape. In some embodiments, the magnetic material can be in a cuboid shape and placed in a cuboid shaped aperture. In some implementations, the larger magnetic material will create a greater field-weakening effect and due to a more elongated shape, the field-weakening effect will be influential over a greater area than a smaller depth aperture and magnet arrangement.

As used herein, magnets and magnetic material can come in any suitable form or be made of any suitable material. For example, magnets can be single or multiple solid masses, can be a powdered form such as a ferrite powder, or can be a liquid. Powders and liquids can be contained in a container or a chamber. The selection of the form of magnet used can be based on the particular characteristics for the arrangement that is being implemented. In some embodiments, the magnetic materials can be rare-earth material alloys, or can be a laminated electrical steel stack.

In the embodiment illustrated in FIG. 1, the illustration (b) shows how a magnetic material 104 and a resilient mechanism 103 are used to close or open the magnetic flux path through the cavity. When the electric machine is revolving the rotor at a low speed, the resilient mechanism pushes the movable magnet material toward the central axis of the rotor, and the resilient mechanism is generally uncompressed, thereby disengaging the field-weakening magnetic material. Therefore, the reluctance of the magnetic flux through the aperture and the field-weakening magnetic material is high, which will cause minimum flux leakage through this path.

In the illustration (c) in FIG. 1, the electric machine is causing the rotor to rotate faster and, due to the greater centrifugal force generated by this faster movement, the magnetic material 104 has overcome the force of the resilient mechanism. This has compressed the resilient mechanism at least partially due to the centrifugal force created by the rotation of the rotor and is almost filling the cavity at the higher rotor speed.

This movement of the movable magnet moves the magnetic material further away from the central axis 107 of the rotor, to engage the field-weakening magnetic material, and disrupts the magnetic field generated by the interaction between the rotor and stator thereby weakening the electromagnetic field. Therefore, the reluctance of the magnetic flux through the aperture and the field-weakening magnetic material is lower, which will cause maximum flux leakage through this path. In this manner, the movable magnetic materials 104 act as field-weakening elements, which are causing field-weakening of the rotor permanent magnets 115 through them 104.

In a rotor, the main permanent magnets can be contained in one or more magnet cavities or magnet pockets. In some embodiments, the field-weakening magnetic materials can be all along the rotor axial length or, in other embodiments, only at portion of their cavities, anywhere along the rotor axis. The field-weakening magnetic material can also be positioned in one or more of the apertures per pole of the rotor.

In some embodiments, the number of movable field-weakening magnetic materials are each located in a separate cavity formed in the rotor body. Such an arrangement as shown in FIG. 1, with movable magnets in each aperture, may create a field-weakening effect around an entire circumference of the rotor.

Further, as used herein, field-weakening magnets are actuated to move with respect to the central axis (in this embodiment the central axis is the elongate axis of the rotor). As illustrated in FIG. 1, some embodiments move the field-weakening magnetic material closer or further from the central axis, thereby changing its distance from the central axis.

Figure 7A:
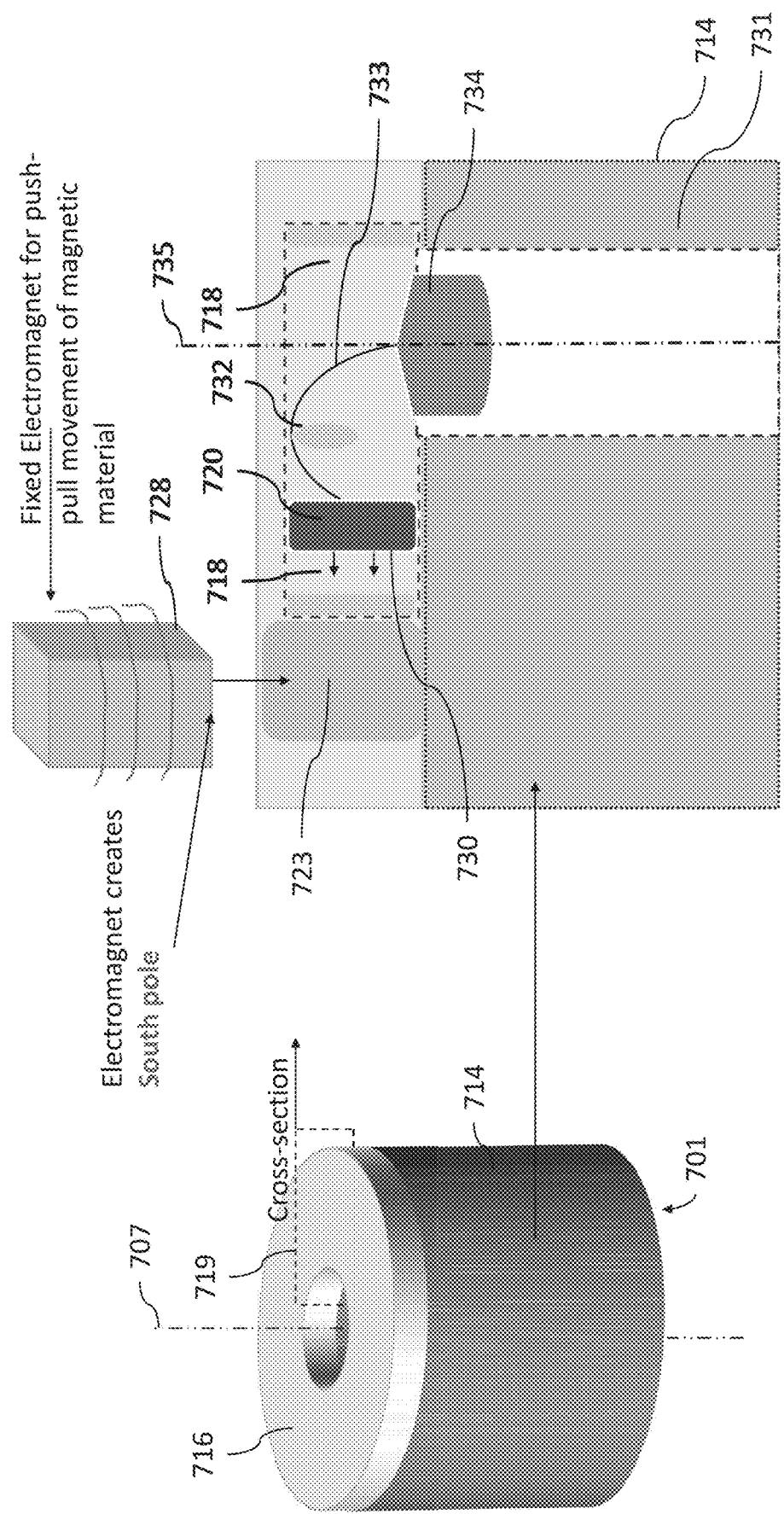
FIG. 7A illustrates another arrangement for field-weakening in accordance with embodiments of the present disclosure where an electromagnet generates an attraction force.

Alternately, movement of the movable field-weakening magnet can be along the axial direction. Such as in FIG. 7A, a movable field-weakening magnet moves along a path parallel to the central axis thereby changing its position relative to the central axis, but not its distance relative to the central axis. FIG. 7A also illustrates an embodiment where movable magnets are moving both with respect to position and distance relative to the central axis.

Figure 2:
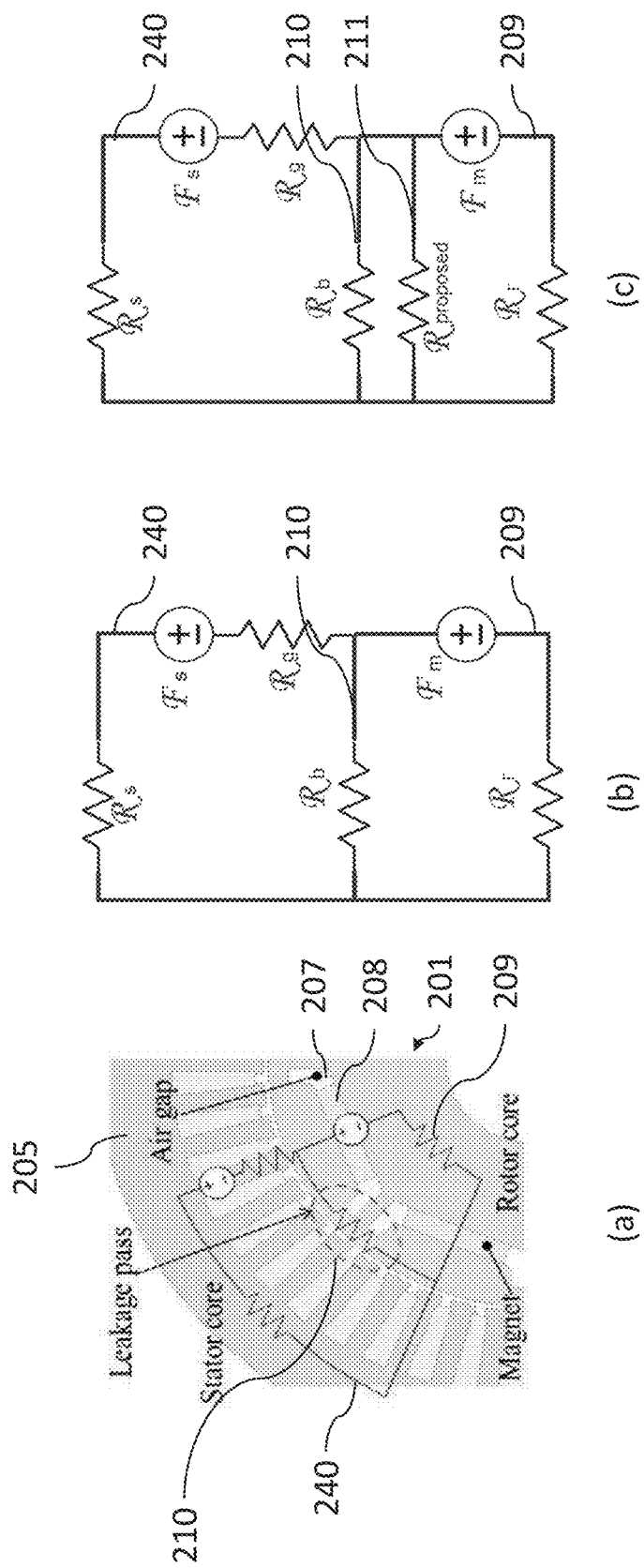
FIG. 2 illustrates the circuit properties of the embodiment illustrated in FIG. 1.

FIG. 2 illustrates the equivalent magnetic circuit properties of the embodiment illustrated in FIG. 1. The illustration (a) of FIG. 2 provides an example of an internal permanent magnet electric machine rotor and stator arrangement wherein the stator 205 is stationary (and utilizes electromagnets) and the rotor 201 (that utilizes non-powered permanent magnets) rotates within the interior of the stator.

The design of the rotor and stator coordinate to create an electromagnetic circuit with a part of the circuit 240 being attributable to the stator and a part of the circuit 209 being attributable to the rotor. At the rotor outer surface, a thin layer of steel (called a rotor bridge or sleeve, represented by a magnetic reluctance component Rb) 210 is where magnetic flux leakage occurs. These bridges or sleeves provide mechanical support to the rotor while the rotor rotates at higher speeds. As shown in illustration (c), through use of the embodiments of the present disclosure, the movable field-weakening magnetic materials can weaken the field created by magnets 208 by the additional flux leaking reluctance component shown as 211 (represented by a field-weakening magnetic reluctance component $R_{proposed}$).

In the embodiment of FIG. 2, the movable field-weakening magnetic material structure is provided by a magnetic material provided in a chamber 207 that has an air gap to allow the magnetic material to move within the chamber. In such an embodiment, the magnetic material can be a powder, liquid, or solid.

The above paragraph illustrates a field-weakening aspect for an interior permanent magnet electric machine such as shown in FIG. 2 at (a). This similar field-weakening will occur with radial movements of magnetic materials positioned at the edges as described in following paragraphs.

Figure 3A:
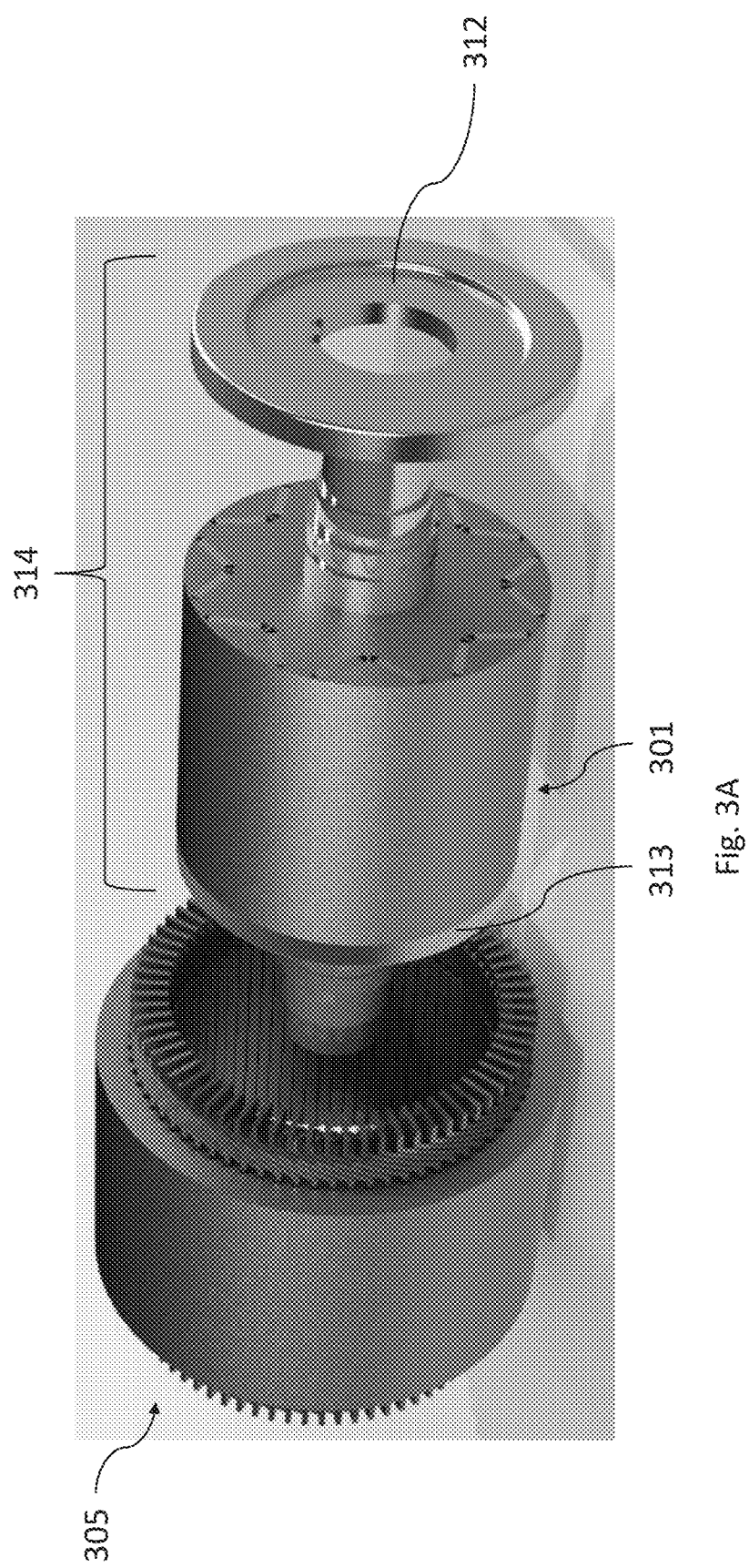
FIG. 3A is an exploded view of a permanent magnet synchronous motor where the arrangement for field-weakening can be implemented in accordance with embodiments of the present disclosure.

FIG. 3A is an exploded view of an arrangement for field-weakening in accordance with embodiments of the present disclosure. In this embodiment, the illustration shows an exploded view of a rotor assembly 314 and stator 305, similar to that discussed in FIG. 2.

In the illustrated embodiment, the rotor assembly 314 includes a ring 312, positioned adjacent to the end of the rotor 301. Typically, in prior installations, this would be a solid ring called a balancing ring that is used to balance the mass of the entire rotor assembly. In the embodiments of the present disclosure, the ring can either have a hollow body (e.g., disk shaped hollow ring) or a solid body with chambers formed therein. The embodiment of FIG. 3A also includes a balancing ring 313 on the other end of the rotor 313. A field-weakening effect is created when the field-weakening magnetic materials are engaged. The movable field-weakening magnetic component can be engaged with the help of centrifugal force that moves them to create leakage path for the main rotor magnets.

At lower speed movable field-weakening magnetic materials are at dis-engaged position, so there will be small or negligible leakage flux through the movable field-weakening magnetic component. However, at higher speed, with the help of centrifugal force the movable field-weakening magnetic component get engaged. When engaged, there will be significant amount of leakage flux through the movable field-weakening magnetic components.

When the speed reduces, centrifugal forces also reduce. Below a certain speed, the push-pull circuit will be activated to activate the electromagnet and generate force to disengage the movable field-weakening magnetic component. So, again, there will be negligible leakage flux through the movable field-weakening magnetic components.

Figure 3B:
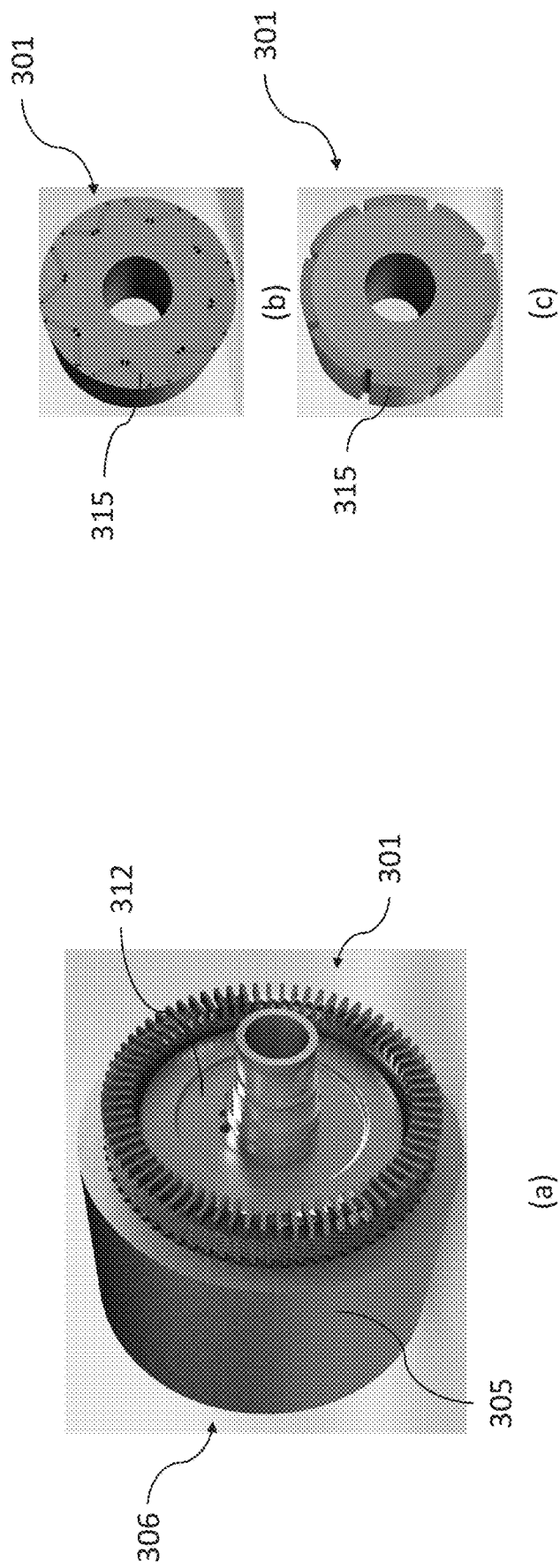
FIG. 3B illustrates at (a) an assembled rotor-stator assembly and at (b) and (c) two types of rotors that can be utilized with embodiments of the present disclosure.

FIG. 3B illustrates at (a) an assembled rotor-stator assembly according to an embodiment of the present disclosure. Here, the elements of FIG. 3A have been assembled together showing the rotor 301 within stator 305 and a ring with field-weakening components 312 mounted at the end surface of the rotor 301.

At (b) a rotor 301 of an interior permanent magnet electric machine is shown. The rotor 301 has a number of permanent magnets 315 provided in its interior. At (c), a rotor of a surface mounted permanent magnet electric machine is shown. The rotor 301 has a number of permanent magnets 315 provided on its outer side surface. Embodiments of the present disclosure can be used with any suitable type of electric machine/rotor with permanent magnets, including these two examples.

Figure 4:
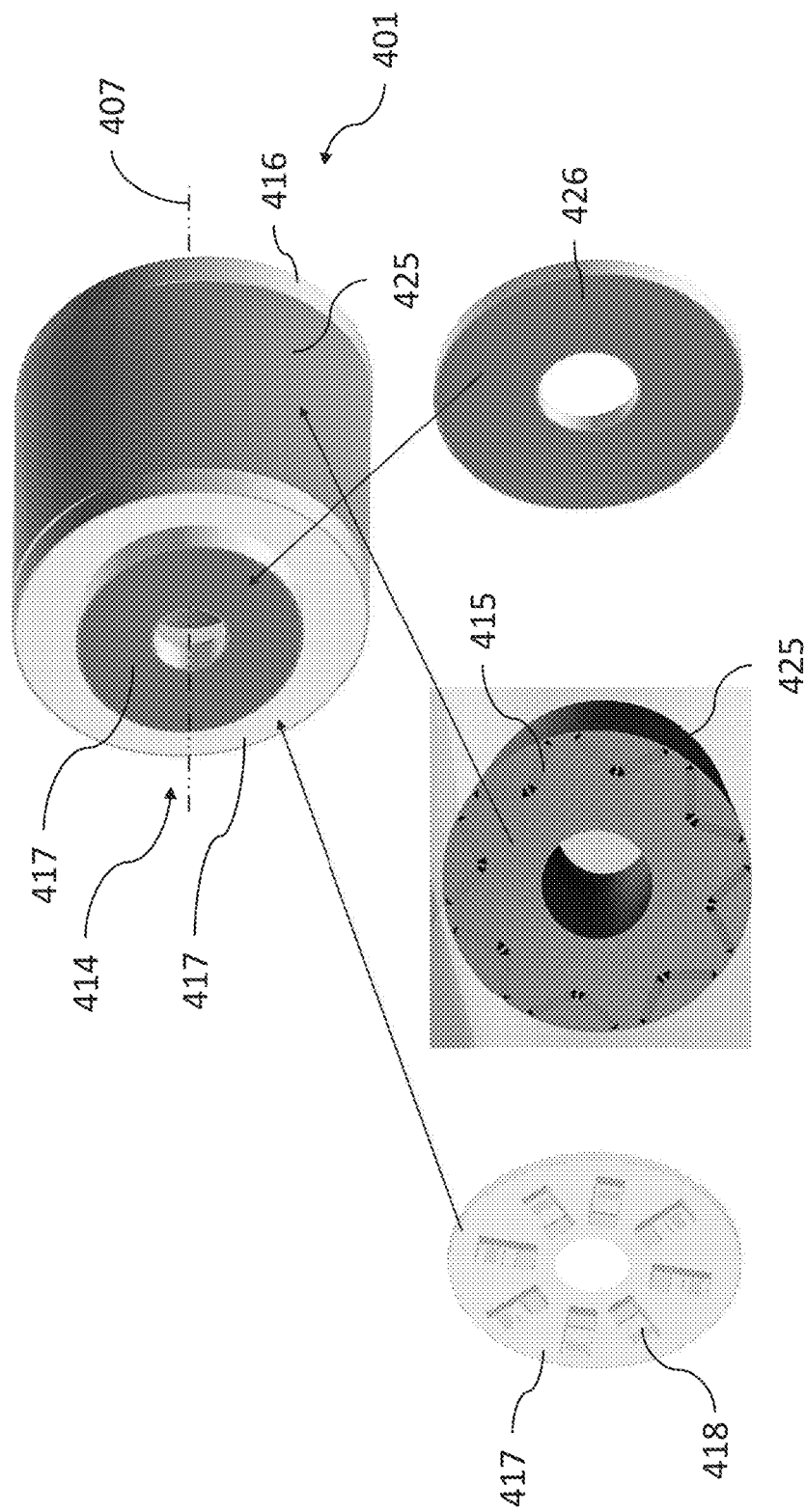
FIG. 4 is another arrangement for field-weakening in accordance with embodiments of the present disclosure.

FIG. 4 is another arrangement for field-weakening in accordance with embodiments of the present disclosure. In the embodiment of FIG. 4, the rotor assembly 401 includes a rotor body 425, a ring 417 with at least one field-weakening chamber 418 having magnetic material therein, and a balancing ring 416 positioned at one end of the rotor body 425.

FIG. 4 is another arrangement for field-weakening in accordance with embodiments of the present disclosure. In this embodiment the rotor body 425 has a field-weakening ring 417 proximate to at least one end. Proximate the ring 417 is an electromagnet ring 426 containing one or more electromagnets. A similar assembly is illustrated in FIG. 6B.

In such embodiments, the one or more electromagnets in ring 426 can be actuated to move (e.g., engage/disengage) the movable field-weakening magnetic material within a movable field-weakening magnetic material chamber 418 (e.g., in the rotor or a field-weakening ring 417) to change the distance of the movable field-weakening magnetic material with respect to the central axis 407. In some such embodiments, the field-weakening chambers can be symmetrically spaced around the central access (as illustrated in the embodiment of FIG. 4), thereby making the field-weakening effect as uniform as possible. This also allows the mass around the central axis of the shaft to be uniform even with the movable magnetic components added to the ring. In this manner, the ring acts as an effective balancing ring in addition to being used for field-weakening.

Figure 5:
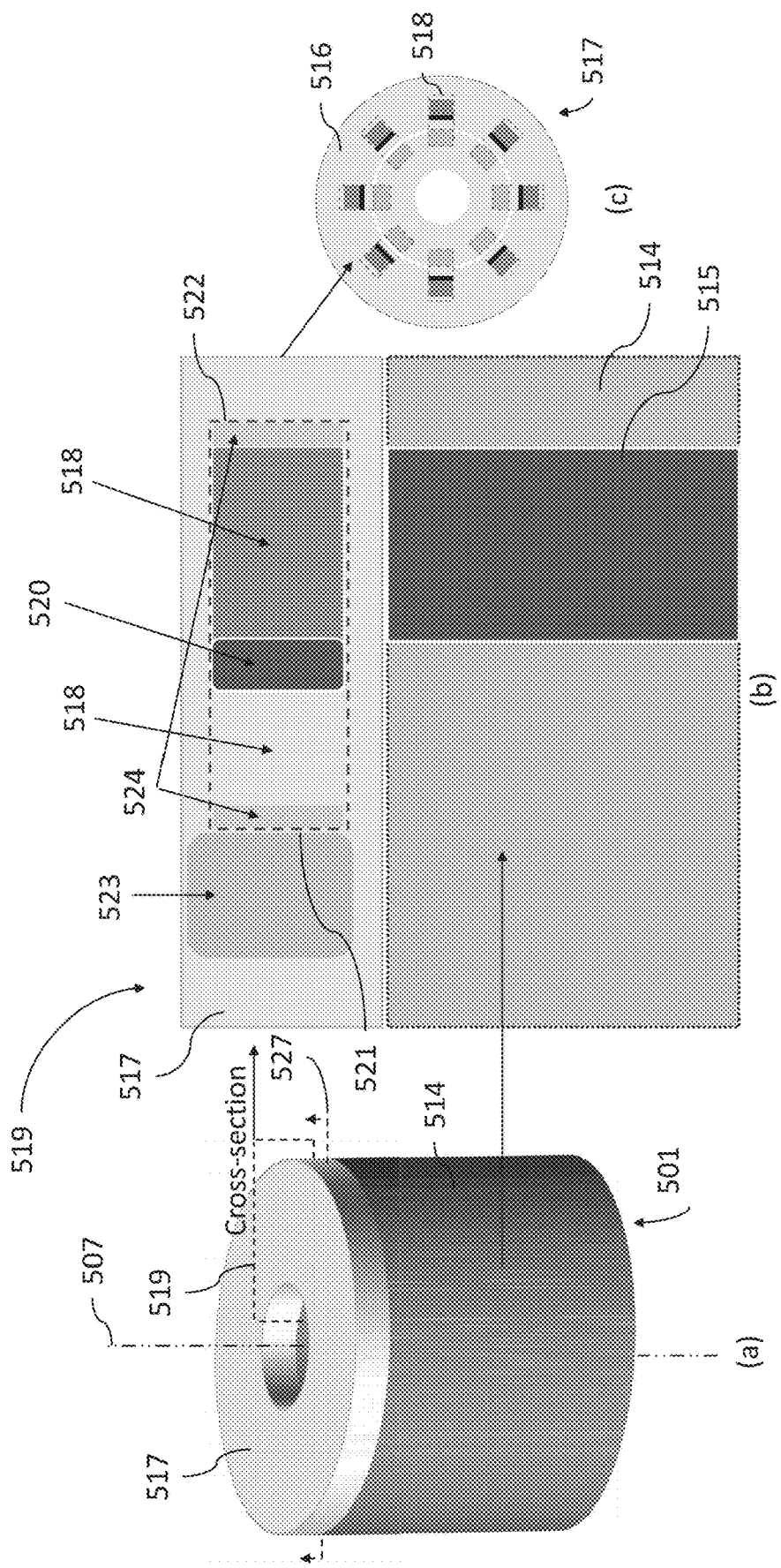
FIG. 5 is another arrangement for field-weakening in accordance with embodiments of the present disclosure.

FIG. 5 is another arrangement for field-weakening in accordance with embodiments of the present disclosure. In the embodiment of FIG. 5, the rotor assembly 501 includes a rotor body 514 (shown in illustrations (a) and (b) and a balancing ring 516 positioned at one end of the rotor body 514 as shown in illustration (a).

The illustration (b) represents a cross section taken at 519 in illustration (a) and shows a number of components within the field-weakening ring 517 and the rotor body 514 For example, the rotor body 514 includes a number of permanent magnets 515 and the field-weakening ring 517 includes a chamber 518 for housing and allowing the movement of a movable field-weakening magnetic component 520. The chamber allows the field-weakening magnetic component 520 to move between an end of the chamber 521 that is close to the central axis 507 and an end of the chamber 522 that is farther away from the central axis 507.

In the embodiment illustrated in FIG. 5, a soft magnet 523 is positioned at the end of the chamber 521 that is close to the central axis 507. The soft magnet 523 is a magnetic component. It can be a magnet or non-magnetized magnetic material. With the help of push-pull electromagnet 426 in FIG. 4, this magnet 523 provides the resilient force to pull the field-weakening magnetic component 520 back toward the end 521 as the rotor speed slows. As the rotor speed increases, centrifugal force overcomes the magnet 523's force and allows the field-weakening magnetic material 520 to move toward the end 522.

In this way, a field-weakening effect can be produced to increase electric machine speed with reduced input current. As discussed in some embodiments described below, an electromagnet can be used instead of or in addition to magnetic component 523. Such an arrangement allows the electromagnet to be switched on or off the change the magnetic flux flowing through the magnetic component 523 from the electromagnet.

In some embodiments, a cushion material 524 can be positioned at the chamber ends 521 and/or 522. The cushion material protects the field-weakening magnetic material 520 and 518 from damage.

In one such embodiment, the rotor assembly includes a field-weakening ring 517 provided adjacent one end of the rotor body 525, the field-weakening ring 517 includes a movable field-weakening magnetic material chamber 518 formed therein, the movable field-weakening magnetic material chamber allowing one of the number of movable field-weakening magnetic materials 520 positioned therein to change its position with respect to its distance to the central axis 507, the movable field-weakening magnetic material chamber having a cushion material 524 within the movable field-weakening magnetic material chamber 518 that interacts with the movable field-weakening magnetic material 520 within the movable field-weakening magnetic material chamber to slow the movement of the movable field-weakening magnetic material 520 and 518.

In various embodiments as shown in FIG. 5, a rotor assembly for an electric machine can include a rotor body 525 that rotates within a stator, the rotor body having a number of permanent magnets 515 that interact with a stator magnetic field generated by electromagnets of a stator to generate an electric current, the permanent magnets 515 rotate with the rotor at a fixed distance from a central axis 507, and wherein the rotor assembly 501 also includes a number of movable field-weakening magnetic materials 518 that move with respect to their distance to the central axis 507.

In various embodiments, each of the number of movable field-weakening magnetic materials is actuated by a resilient mechanism to move its associated movable field-weakening magnetic material with respect to the movable field-weakening magnet's distance to the central axis. In some embodiments, each of the number of movable field-weakening magnetic materials is actuated by a magnetic mechanism to move its associated movable field-weakening magnetic material with respect to, for example, the movable field-weakening magnet's distance to the central axis. The magnetic mechanism can be an electromagnetic mechanism.

The number of movable field-weakening magnetic materials can be provided in the rotor body or proximate to the rotor body, such as in a balancing ring. This modified balancing ring can be referred to as a field-weakening ring. For example, the rotor assembly can include a field-weakening ring provided adjacent an end of the rotor and wherein the number of movable field-weakening magnetic materials are provided in the field-weakening ring.

For instance, the field-weakening ring can include a movable field-weakening magnetic material chamber formed therein, the movable field-weakening magnetic material chamber allowing one of the number of movable field-weakening magnetic materials positioned therein to change its position with respect to its distance to the central axis. As shown in FIG. 5, the movable field-weakening magnetic material chamber can have a fixed soft magnet adjacent to one end of the movable field-weakening magnetic material chamber.

In some embodiments, the rotor assembly includes a field-weakening ring provided adjacent one end of the rotor and wherein the number of movable field-weakening magnetic materials provided in the field-weakening ring. the rotor assembly includes a field-weakening component provided adjacent one end of the rotor, the field-weakening component including a movable field-weakening magnetic material chamber formed therein, the movable field-weakening magnetic material chamber allowing one of the number of movable field-weakening magnetic materials positioned therein to change its position with respect to its distance to the central axis. I various embodiments, the rotor assembly includes a field-weakening ring provided adjacent one end of the rotor, the field-weakening ring including a movable field-weakening magnetic material chamber formed therein, the movable field-weakening magnetic material chamber having a fixed magnet adjacent to one end of the movable field-weakening magnetic material chamber.

Further, in some implementations, the rotor assembly includes a field-weakening component provided adjacent one end of the rotor, the field-weakening component including a movable field-weakening magnetic material chamber formed therein, and the movable field-weakening magnetic material chamber having an electromagnet proximate to one end of the movable field-weakening magnetic material chamber.

The rotor assembly can be configured to include a field-weakening component provided adjacent one end of the rotor, the field-weakening component including a movable field-weakening magnetic material chamber formed therein, the movable field-weakening magnetic material chamber having a fixed magnet adjacent to one end of the movable field-weakening magnetic material chamber and an electromagnet proximate the fixed magnet adjacent to the one end of the movable field-weakening magnetic material chamber. And, in some embodiments, the rotor assembly includes a field-weakening component provided adjacent one end of the rotor, the field-weakening component including a movable field-weakening magnetic material chamber formed therein, the movable field-weakening magnetic material chamber allowing one of the number of movable field-weakening magnetic materials positioned therein to change its position with respect to its distance to the central axis, the movable field-weakening magnetic material chamber having a cushion material within the movable field-weakening magnetic material chamber that interacts with the movable field-weakening magnetic material within the movable field-weakening magnetic material chamber to slow the movable field-weakening magnet.

A balancing ring and the body of a field-weakening ring can be any suitable material. For example, the ring's body can be fabricated from an aluminum-like, non-magnetic disk and, as discussed above, can have hollow or solid interior portions.

The rotor body can also be made from any suitable material. For example, the rotor body can be made of a stack of thin laminations, which contain magnets inside their cavities (e.g., 415) or on its outer surface (e.g., 315). The illustration (c) of FIG. 5 is a cut-away of illustration (a) taken at line 527. In this illustration, the field-weakening ring 517 includes multiple movable field-weakening structures shown in 519 (illustration (b)). In such embodiments, the field-weakening effect is more uniform around the central axis of the rotor. This allows for more consistent field-weakening resulting in a more consistent ability to increase the speed of the electric machine.

Figure 6A:
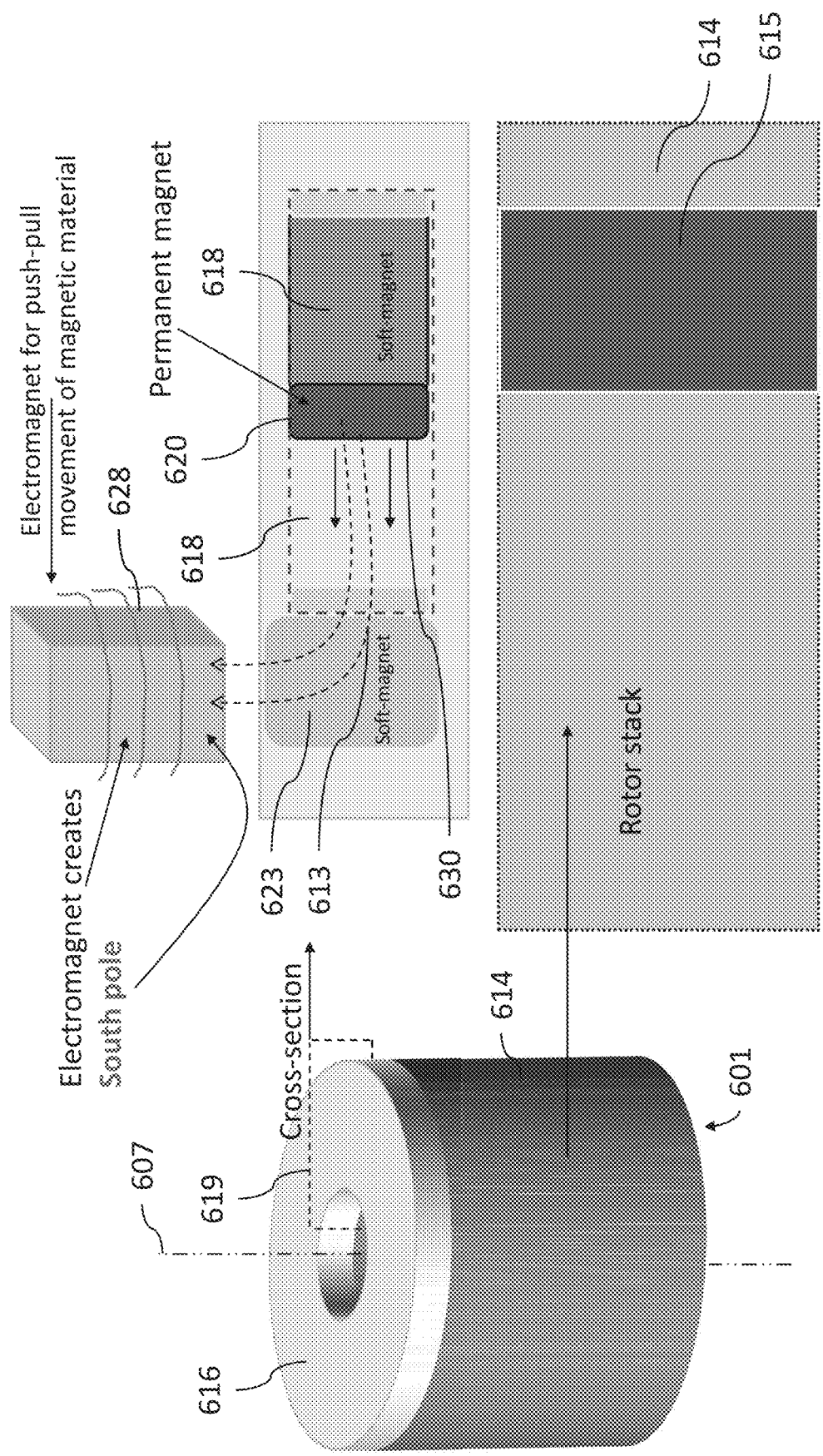
FIG. 6A illustrates another arrangement for field-weakening in accordance with embodiments of the present disclosure where an electromagnet generates an attraction force.
Figure 6B:
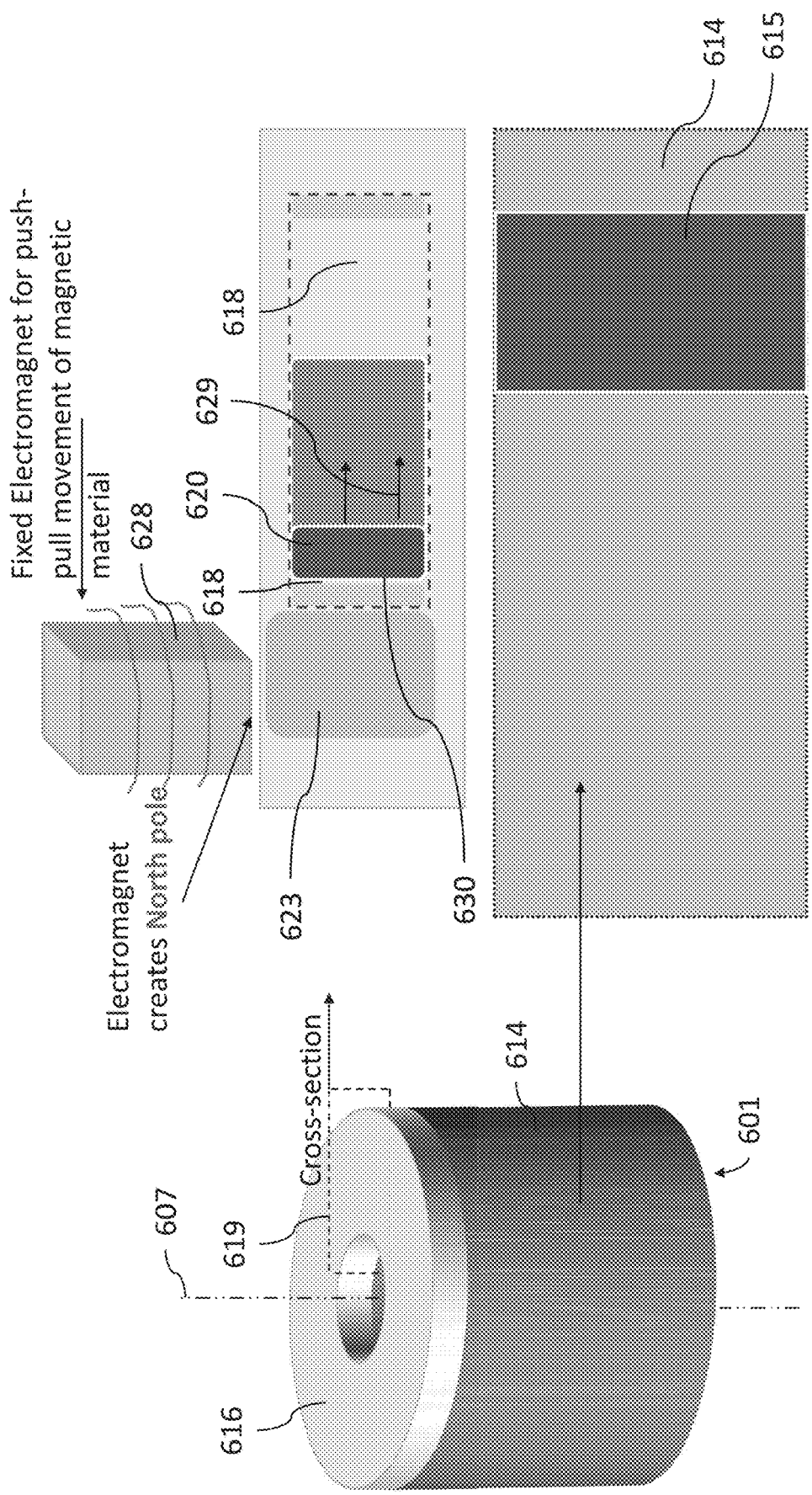
FIG. 6B illustrates the arrangement for field-weakening illustrated in FIG. 6A where the electromagnet generates a repulsion force.

FIGS. 6A and 6B illustrate another arrangement for field-weakening in accordance with embodiments of the present disclosure. FIG. 6A illustrates an arrangement where an electromagnet generates an attraction force. FIG. 6B illustrates the arrangement illustrated in FIG. 6A where the electromagnet generates a repulsion force.

In this embodiment, the rotor assembly includes a field-weakening ring 616 provided adjacent one end of the rotor body 614. The field-weakening ring includes a movable field-weakening magnetic material chamber 618 formed therein, the movable field-weakening magnetic material chamber 618 having an electromagnet 628 proximate to one end of the movable field-weakening magnetic material chamber 618.

The rotor assembly also includes a fixed magnet 623 adjacent to one end of the movable field-weakening magnetic material chamber 618 and an electromagnet 628 proximate the fixed magnet 623 adjacent to the one end of the movable field-weakening magnetic material chamber. In such embodiments, the fixed magnet can be a magnetic material that does not have magnetic properties until the electromagnetic imparts those properties on the magnetic material 623 upon activation of the electromagnet or soft magnetic materials that can be easily magnetized and demagnetized. In this manner, the position at the end of the chamber 618 provides a magnetic push (engage) and/or pull (disengage) effect that is more aligned with the direction of elongation of the chamber, thereby allowing the movable field-weakening magnetic material 620 to slide back and forth in the chamber 618 more linearly.

FIG. 6A illustrates how the excitation in the electromagnet 628 can create a south pole and trigger a pull on the north pole of magnet 620 of side 630 in the chamber 618. This attraction force 613 pulls the magnet 620 to the left via the combination of electromagnet 628 and magnetic material 623, thereby disengaging the field-weakening magnetic material.

In some implementations, as shown in FIG. 6B, if the magnet 620 comes close to magnetic material 623 and the electromagnet 628 is turned off, the magnet 620 will remain attached to the magnetic material 623. In this configuration the movable field-weakening magnetic material 620 will be far from the rotor magnets 615, and so there will be less or no field-weakening (disengaged state). When the movable field-weakening magnetic material returns to the right side of the chamber, the field-weakening effect will increase (engaged state). This process is illustrated in FIG. 6B.

In this process, the electromagnet is actuated to generate a repulsion force 629 that moves the moveable field-weakening magnetic material 620 away from the magnetic material 623. In this example, the electromagnet creates a north pole that is proximate the magnetic material and this pole interacts with the north pole of the moveable field-weakening magnetic material 620 to repel the moveable field-weakening magnetic material 620 thereby moving the moveable field-weakening magnetic material 620 toward the rotor magnets 615 and increasing the field-weakening effect, thereby engaging the field-weakening magnetic material.

FIGS. 7A and 7B illustrate another arrangement for field-weakening in accordance with embodiments of the present disclosure. FIG. 7A illustrates an arrangement where an electromagnet generates an attraction force to disengage the field-weakening magnetic material. FIG. 7B illustrates the arrangement of FIG. 7A where the electromagnet generates a repulsion force to engage the field-weakening magnetic material.

In this embodiment, as in the embodiment of FIGS. 6A and 6B, the rotor assembly includes a field-weakening ring 716 provided adjacent one end of the rotor body 714, the field-weakening ring includes a movable field-weakening magnetic material chamber 718 formed therein. The rotor assembly also includes a magnetic material 723 adjacent to one end of the movable field-weakening magnetic material chamber 718 and an electromagnet 728 proximate the magnetic material 723 adjacent to the one end of the movable field-weakening magnetic material chamber.

However, this embodiment does have some differences. For example, the field-weakening ring 716 includes a first movable field-weakening magnetic material chamber 718 allowing a first of the number of movable field-weakening magnetic materials 720 positioned therein to change its position with respect to its distance to the central axis 707 and the rotor body 714 has a second movable field-weakening magnetic material chamber 731 that allows a second of the number of movable field-weakening magnetic materials 734 positioned therein to change its position along a chamber axis 735 that is parallel with respect to the central axis 707 of the rotor 714. This allows the field-weakening effect to be distributed along an axis parallel to the central axis and at a location close to the rotor-stator junction which may provide better field-weakening effect.

This can be accomplished, for example, by tethering the second of the number of field-weakening magnetic materials 734 to the first of the number of movable field-weakening magnetic materials 720, via a filament 733. Thereby, as the first of the number of movable field-weakening magnetic materials 720 articulates through its movable field-weakening magnetic material chamber 718, the second of the number of movable field-weakening magnetic materials 734 articulates through its chamber 731. In some embodiments, in order for the tether to pull the second of the number of movable field-weakening magnetic materials 734, some embodiments may also include an angle changing structure 732 that aids in changing the direction of the tether to move the second of the number of movable field-weakening magnetic materials 734 more closely along the elongate direction of the second movable field-weakening magnetic material chamber 731.

It should be noted that in some of the embodiments similar to FIGS. 6A and 6B and 7A and 7B, the embodiments may just have magnetic material 623/723 (no electromagnet) used as the force to move the movable field-weakening magnetic material 620/720 or the electromagnet can be positioned at the location of the magnetic material 623/723.

FIG. 8 is another arrangement for field-weakening in accordance with embodiments of the present disclosure. This embodiment will be utilized in an elongate aperture 802 within a rotor body 801. In this embodiment, a number of field-weakening magnetic materials are positioned in their cavities.

The field-weakening magnetic materials are supported by mechanically robust structure. This supporting mechanical structure can be extended at two ends of the rotor core. The extended structure can be used to support the structure during movement of the field-weakening magnetic material assembly. In some implementations, the supporting mechanical structure can be extended at two ends of the rotor core. The extended supporting structure can be actuated, for example, by centrifugal force and/or a magnetic mechanism to move its associated movable field-weakening magnetic material with respect to the central axis.

The shape of the field-weakening component includes top and bottom portions 856 and a central elongate portion having outer support surfaces 852 that maintain the shape of a magnetic material 854 positioned between the support surfaces. The support surfaces 852 can be a non-magnetic material such as aluminum or magnetic material such as laminated electrical steel. The key feature of support surfaces 852 will be their good elasticity, so they can provide robustness to the connected bodies made with 854,852, and 856.

The field-weakening magnetic material 854 can be a non-magnetized magnetic material such as a laminated electrical steel or a magnetized magnet such as a Neodymium alloy-based magnet. In a case where magnetic material 854 is a magnetized permanent magnet, the movement of 854, 852, and 856 can have bigger impact toward the field-weakening of the main permanent magnets. The shape of the magnetic material 854 can be rectangular or cylindrical, while the structure of their support 852 will be modified accordingly to hold magnetic material 854.

The top and bottom portions 856 provide additional mass to aid in the engaging and disengaging of the magnetic material 854. The top, bottom, and central elongate portions all move together. The top and bottom portions 856 can also provide additional support being a component of push-pull mechanism to engage and dis-engage 854 and moving the connected body of 854, 852, and 856 altogether closer or farther from the center axis of the shaft.

The actuation mechanism can be mechanical through use of centrifugal force and/or resilient and/or electromechanical actuation. The movement of the field-weakening component 854 can be within the aperture 802 but closer or farther from the center axis of the shaft. The movement of the field-weakening component 854 can also be between an upper position (e.g., one where the top extends out from the rotor farther than the bottom) and a lower position (e.g., one where the bottom extends out from the rotor farther than the top).

Figure 9:
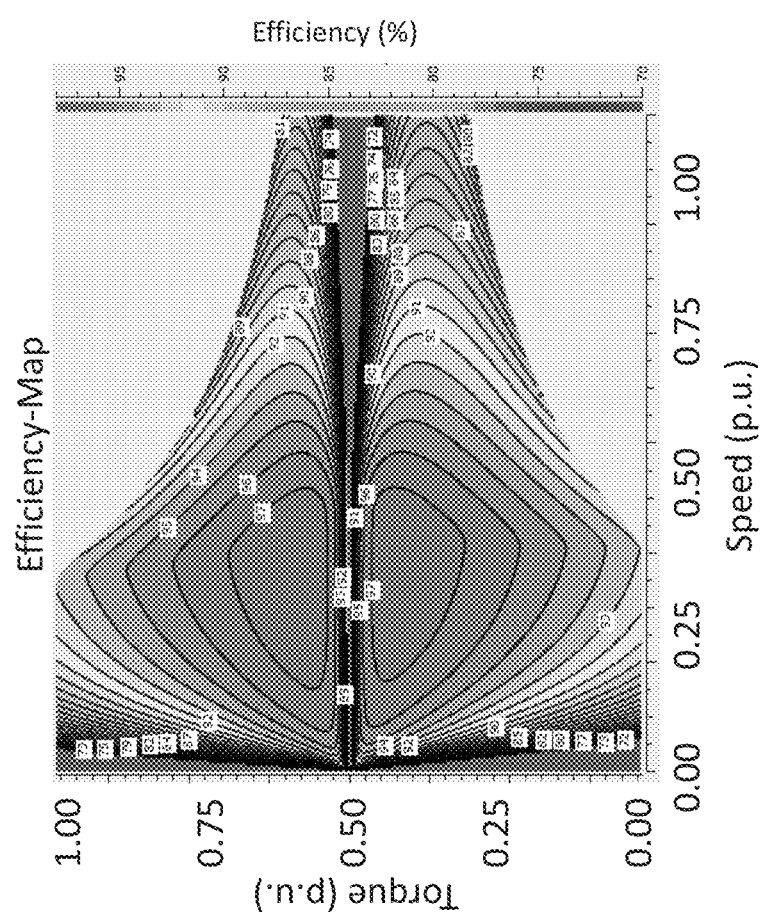
FIG. 9 is an efficiency map of a motor used in an electric vehicle.

FIG. 9 is an efficiency map of an electric machine used in an electric vehicle. As can be seen by this data there is a significant drop off in efficiency at the higher speeds. It is in these areas of electric machine function where the embodiments of the present disclosure can be most beneficial. Some advantages of the embodiments of the present disclosure include the increase in efficiency around the zero torque levels at the higher speed region of an electric machine's functional range (e.g., 0.3+p.u speeds, in the illustrated example) and increased maximum power availability in the high speed range.

Figure 10:
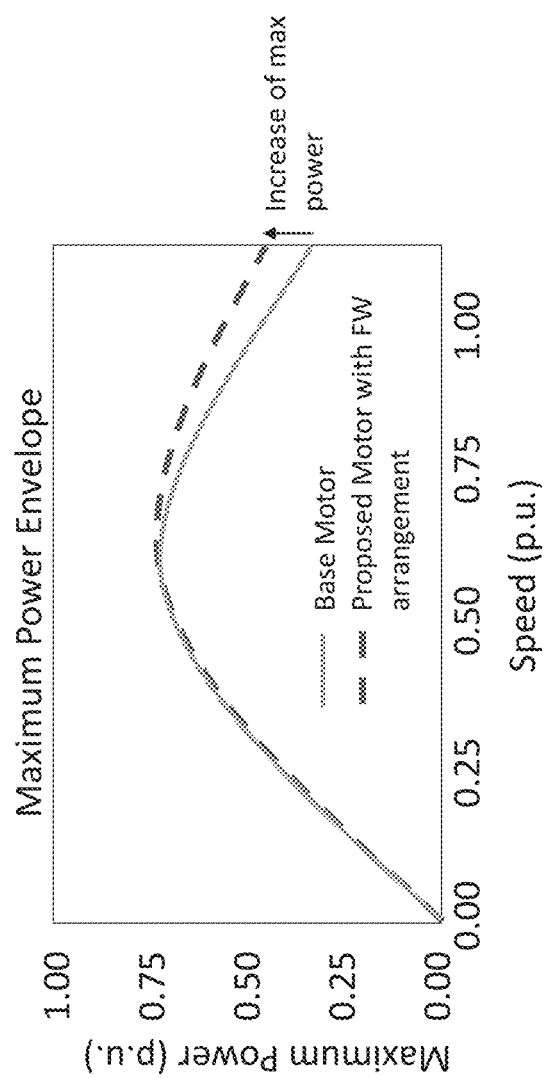
FIG. 10 is a comparison of performance between a base motor and one using an embodiment of the present disclosure.

FIG. 10 is a comparison of performance between a base electric machine and one using an embodiment of the present disclosure. This plot shows the maximum power of the base electric machine (solid line) vs the concept electric machine utilizing an embodiment of the present disclosure (dashed line) for a particular current and voltage limitation. As can be discerned from the plot, the electric machine utilizing an embodiment sees a significant increase in speed. This improvement is based upon field-weakening effect produced by the movable field-weakening magnetic material utilized by the embodiment.

The proposed arrangements disclosed herein utilize mechanical structures or electromechanical structures that will partially field-weaken the magnetic field of a permanent magnet electric machine. No current system is known that utilizes centrifugal force, magnetic materials, and/or other features of the proposed arrangements discussed herein. Accordingly, substantial performance gains can be realized through use of the embodiments disclosed herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion and not a restrictive one. Combination of the above embodiments, and other embodiments not specifically described herein, will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A rotor assembly for an electric machine, comprising:
a rotor body that moves with respect to a central axis, the rotor body having a core and a number of permanent magnets that move with the rotor body, and the rotor body also having a number of movable field-weakening magnetic materials that move with respect to the permanent magnets and to the central axis, wherein each of the movable field-weakening magnetic materials has a magnetic material proximate to one end of the movable field-weakening magnetic materials and wherein each of the movable field-weakening magnetic materials is actuated by centrifugal force and a magnetic mechanism provided by the magnetic material proximate the one end to move its associated movable field-weakening magnetic material with respect to the central axis.

2. The rotor assembly of claim 1, wherein the number of movable field-weakening magnetic are each located in a separate cavity formed in the rotor body.

3. The rotor assembly of claim 2, wherein a number of field-weakening magnetic materials are positioned in their cavities.

4. The rotor assembly of claim 2, wherein a supporting mechanical structure is extended at two ends of the rotor core.

5. The rotor assembly of claim 4, wherein the extended supporting structure is actuated by centrifugal force and a magnetic mechanism to move its associated movable field-weakening magnetic material with respect to the central axis.

6. The rotor assembly of claim 1, wherein each of the number of movable field-weakening magnetic materials is actuated by a resilient mechanism to move its associated movable field-weakening magnetic material with respect to the movable field-weakening magnet's distance to the central axis.

7. The rotor assembly of claim 6, wherein the resilient mechanism is a mechanical mechanism or resilient material.

8. A rotor assembly for an electric machine, comprising:
a rotor body that rotates around a central axis, the rotor body having a core and a number of permanent magnets that rotate with the rotor body at a fixed distance from the central axis, and the rotor body also having a number of movable field-weakening magnetic materials that move with respect to their distance to the central axis, wherein the rotor assembly includes a field-weakening component provided adjacent one end of the rotor, the field-weakening component including a movable field-weakening magnetic material chamber formed therein, and the movable field-weakening magnetic material chamber having an electromagnet proximate to one end of the movable field-weakening magnetic material chamber.

9. The rotor assembly of claim 8, wherein each of the number of movable field-weakening magnetic materials is actuated by centrifugal force and a magnetic mechanism to move its associated movable field-weakening magnet with respect to the central axis.

10. The rotor assembly of claim 9, wherein the magnetic mechanism is an electromagnetic mechanism.

11. The rotor assembly of claim 8, wherein the number of movable field-weakening magnetic materials are provided in the rotor body.

12. The rotor assembly of claim 8, wherein the rotor assembly includes a field-weakening ring provided adjacent one end of the rotor and wherein the number of movable field-weakening magnetic materials are provided in the field-weakening ring.

13. The rotor assembly of claim 8, wherein the rotor assembly includes a field-weakening component provided adjacent one end of the rotor, the field-weakening component including a movable field-weakening magnetic material chamber formed therein, the movable field-weakening magnetic material chamber allowing one of the number of movable field-weakening magnetic materials positioned therein to change its position with respect to its distance to the central axis.

14. The rotor assembly of claim 8, wherein the rotor assembly includes a field-weakening ring provided adjacent one end of the rotor, the field-weakening ring including a movable field-weakening magnetic material chamber formed therein, the movable field-weakening magnetic material chamber having a fixed magnet adjacent to one end of the movable field-weakening magnetic material chamber.

15. The rotor assembly of claim 8, wherein the rotor assembly includes a field-weakening component provided adjacent one end of the rotor, the field-weakening component including a movable field-weakening magnetic material chamber formed therein, the movable field-weakening magnetic material chamber having a fixed magnet adjacent to one end of the movable field-weakening magnetic material chamber and an electromagnet proximate the fixed magnet adjacent to the one end of the movable field-weakening magnetic material chamber.

16. The rotor assembly of claim 8, wherein the rotor assembly includes a field-weakening component provided adjacent one end of the rotor, the field-weakening component including a movable field-weakening magnetic material chamber formed therein, the movable field-weakening magnetic material chamber allowing one of the number of movable field-weakening magnetic materials positioned therein to change its position with respect to its distance to the central axis, the movable field-weakening magnetic material chamber having a cushion material within the movable field-weakening magnetic material chamber that interacts with the movable field-weakening magnetic material within the movable field-weakening magnetic material chamber to slow the movable field-weakening magnet.

17. An electric machine, comprising:
a stator having a plurality of electromagnets generating a magnetic field, wherein the electromagnets are arranged around a central axis; and
a rotor assembly having a rotor body that rotates around a central axis, the rotor body having a number of permanent magnets that rotate with the rotor at a fixed distance from a central axis, and the rotor body also having a number of movable field-weakening magnetic materials that move with respect to the central axis, wherein each of the movable field-weakening magnetic materials has a magnetic material proximate to one end of the movable field-weakening magnetic materials and wherein each of the movable field-weakening magnetic materials is actuated by centrifugal force and a magnetic mechanism provided by the magnetic material proximate the one end to move its associated movable field-weakening magnetic material with respect to the central axis.

18. The rotor assembly of claim 17, wherein the rotor body includes a movable field-weakening magnetic material chamber that allows one of the number of movable field-weakening magnetic materials positioned therein to change its lateral position along a chamber axis that is parallel with respect to the central axis.

19. The system of claim 17, wherein the rotor body includes a first movable field-weakening magnetic material chamber allowing a first of the number of movable field-weakening magnetic materials positioned therein to change its position with respect to its distance to the central axis and a second movable field-weakening magnetic material chamber that allows a second of the number of movable field-weakening magnetic materials, positioned therein to change its lateral position along a chamber axis with respect to the central axis.

20. A rotor assembly for an electric machine, comprising:

a rotor body that moves with respect to a central axis, the rotor body having a core and a number of permanent magnets that move with the rotor body, and the rotor body also having a number of movable field-weakening magnetic materials that move with respect to the permanent magnets and to the central axis, wherein each of the movable field-weakening magnetic materials has a magnetic material proximate to one end of the movable field-weakening magnetic materials; and each of the movable field-weakening magnetic materials is actuated by centrifugal force and a magnetic mechanism provided by the magnetic material proximate the one end to move its associated movable field-weakening magnetic material with respect to the central axis.

\* \* \* \* \*